United States Patent
Kanai et al.

[11] Patent Number: 6,118,570
[45] Date of Patent: *Sep. 12, 2000

[54] LASER BEAM SCANNING OPTICAL APPARATUS

[75] Inventors: Nobuo Kanai, Toyohashi; Jun Kohsaka; Hiroshi Hiraguchi, both of Toyokawa, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,615

[22] Filed: Jul. 22, 1997

[30] Foreign Application Priority Data

Jul. 22, 1996 [JP] Japan .................................... 8-191714

[51] Int. Cl.[7] .................................................. G02B 26/08
[52] U.S. Cl. .......................... 359/210; 359/207; 359/212; 359/216; 250/234
[58] Field of Search ..................................... 359/205–207, 359/209–210, 212–219; 250/234–236, 201.2

[56] References Cited

U.S. PATENT DOCUMENTS

| | | |
|---|---|---|
| 4,990,771 | 2/1991 | Minoura et al. ........................ 250/236 |
| 5,122,658 | 6/1992 | Ando ....................................... 250/235 |
| 5,231,280 | 7/1993 | Imakawa ............................... 250/201.5 |
| 5,241,174 | 8/1993 | Ando ....................................... 250/235 |
| 5,418,638 | 5/1995 | Hirasawa ................................ 359/197 |
| 5,442,171 | 8/1995 | Anzai ....................................... 359/216 |
| 5,615,038 | 3/1997 | Suzuki et al. ........................... 359/210 |
| 5,627,670 | 5/1997 | Minoura et al. ......................... 359/212 |

*Primary Examiner*—James Phan
*Attorney, Agent, or Firm*—Sidley & Austin

[57] ABSTRACT

A laser beam scanning optical apparatus has a focusing lens having different optical powers in the main scanning direction and the sub-scanning direction, moving means for moving the focusing lens on an optical direction, detecting means for detecting a state of convergence of the laser beam on a scanned surface, and control means for adjusting the convergence position of the laser beam by moving the focusing lens via driving said moving means based on the detection result of the detection means. In the aforementioned construction, the state of the convergence of the laser beam on a scanned surface is adjusted in the main scanning direction and the sub-scan direction by moving the focusing lens in an optical axis. The focusing lens is moved to a position of optimum convergence based on the construction of the optical system by detecting the state of convergence in the main scan direction and the sub-scan direction via a detecting means.

11 Claims, 5 Drawing Sheets

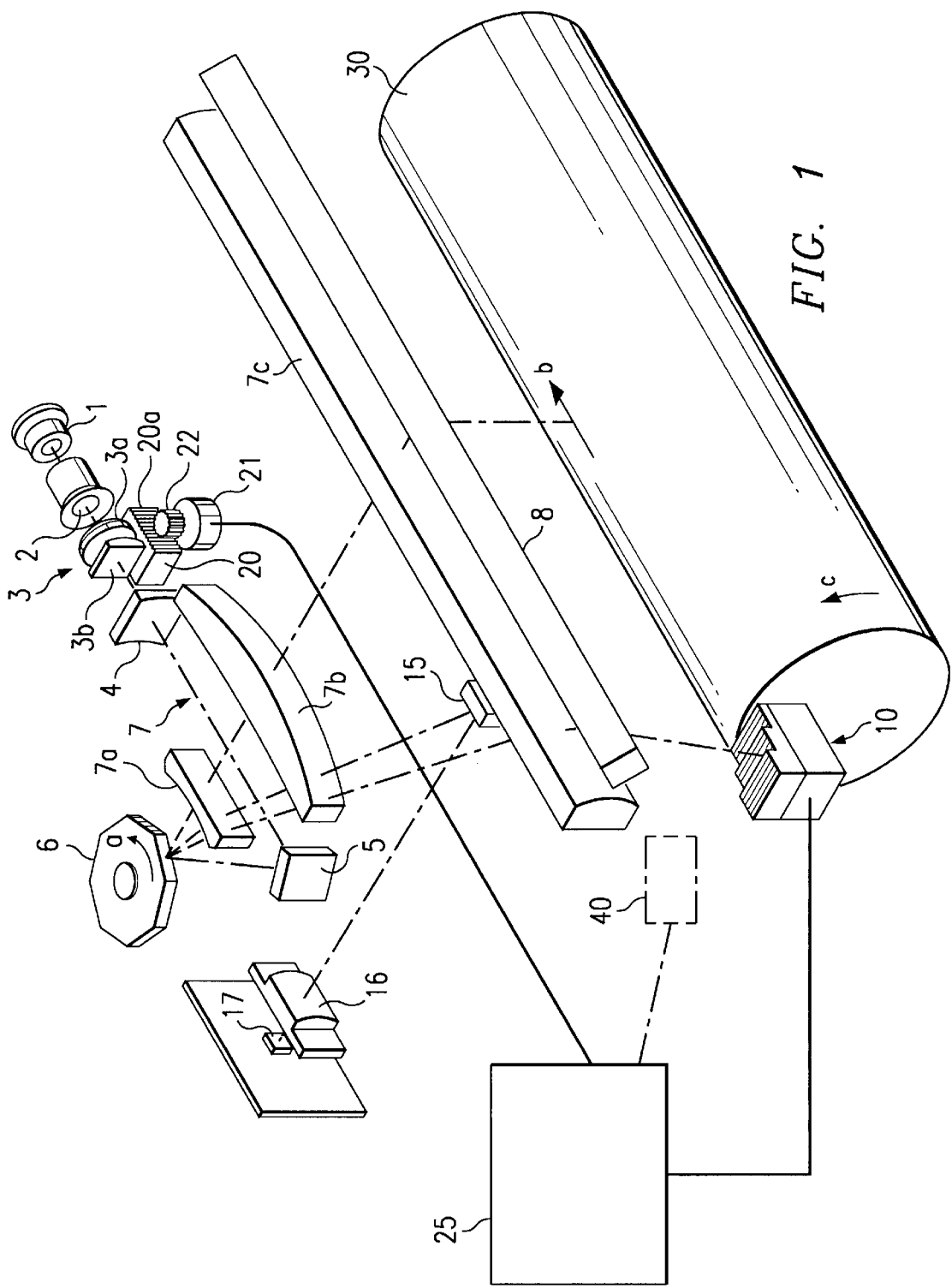

LASER BEAM SCANNING OPTICAL APPARATUS

FIELD OF THE INVENTION

The present invention relates to a laser beam scanning optical apparatus, and specifically relates to a laser beam scanning optical apparatus included in laser printers or digital photocopiers as an image printing means.

BACKGROUND OF THE INVENTION

Laser printers of the electrophotographic type typically use a laser beam scanning optical apparatus having a laser diode as a light source to write images on the surface of a photosensitive member. A laser beam emitted from the laser diode is condensed by a collimator lens, deflected at equiangularity by a deflection device, and scans the surface of a photosensitive member at uniform speed via an fθ optical element.

In laser beam scanning optical apparatuses of this type, there is a tendency of changes in the oscillation wavelength of the laser diode, changes of the refractive index and shape of the lenses, and changes of the spacing between lenses to occur in conjunction with fluctuations of environmental temperature, which cause fluctuation of the focal length of the optical system and result in disadvantages including fluctuating beam spot diameter on the image plane (i.e., photosensitivemember), and poor image quality. Variation of the condensed state of the laser beam occurring due to fluctuation of the environmental temperature is particularly marked when the lens is formed of resin materials.

In order to counteract the aforesaid disadvantages, Japanese Laid-Open Patent Application No. 2-58016 discloses a method for correcting the beam convergence position by optically detecting the state of convergence of the laser beam at equivalent positions on the photosensitive member and moving the focusing lens to make said correction. In optical devices of this type, however, lens systems have different optical powers in the main scan direction and the sub-scan direction, such that when, for example, the convergence position is adjusted only in the main scan direction, such adjustment is not attained in the sub-scan direction.

Japanese Laid-Open Patent Application No. 4-58211 proposes a method of separate focus adjustments for the main scan direction and the sub-scan direction. Separately adjusting the focus in the main scan and sub-scan directions, however, increases the size, complexity and cost of the adjustment mechanism.

SUMMARY OF THE INVENTION

An object of the present invention is to provide a laser beam scanning optical apparatus capable of simultaneously adjusting the convergence state of a laser beam in both the main scan direction and the sub-scan direction via a simple mechanism.

This object of the present invention is attained by providing a laser beam scanning optical apparatus comprising:

a focusing lens having different optical powers in the main scan direction and the sub-scan direction;

moving means for moving said focusing lens on an optical axis;

detecting means for detecting the state of convergence of a laser beam on a scanned surface; and control means for adjusting the convergence position of a laser beam by moving said focusing lens via driving said moving means based on the detection result of said detecting means.

In the aforesaid construction, the convergence state on a scanned surface is adjusted in the main scan direction and the sub-scan direction by moving said focusing lens on an optical axis. The focusing lens is moved to a position of optimum convergence based on the construction of the optical system by detecting the state of convergence in the main scan direction and the sub-scan direction via a detecting means.

The present invention is capable of adjusting the state of convergence of a beam in a scanning plane commonly in both the main scan direction and the sub-scan direction via a simple adjusting mechanism because the focusing lens has different optical powers in the main scan direction and the sub-scan direction, and achieves lower cost by simplification of the adjusting mechanism.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 1 is a perspective view of a laser beam scanning optical apparatus of one embodiment of the present invention;

DESCRIPTION OF THE PREFERRED EMBODIMENT

Figure 2A:
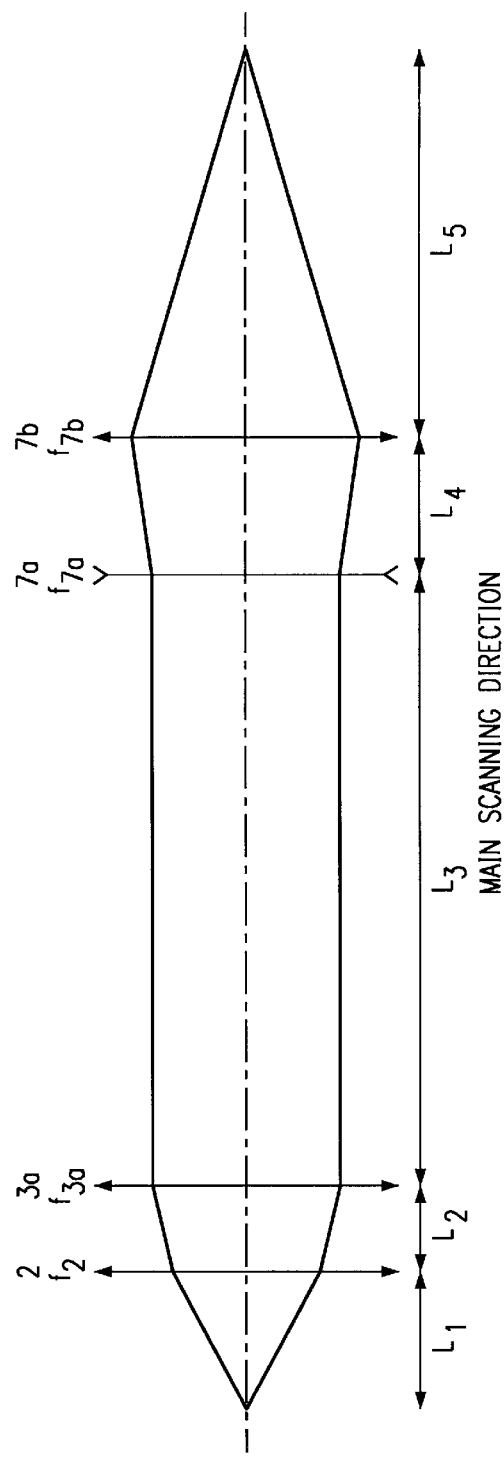
FIG. 2(A) is a diagram of the state of convergence of a laser beam in the main scan direction.

A preferred embodiment of the laser beam scanning optical apparatus of the present invention is described hereinafter with reference to the accompanying drawings.

In FIG. 1, a laser beam scanning optical apparatus comprises a laser diode 1, collimator lens 2, focusing lens 3, cylindrical lens 4, plane mirror 5, polygonal mirror 6, fθ lens 7 (comprising lenses 7a, 7b, 7c), plane mirror 8, SOS (start of scanning) plane mirror 15, SOS cylindrical mirror 16, SOS optical sensor 17, and beam waist detection device 10.

Laser diode 1 is modulated (ON/OFF control) based on a image data input to the control unit 25), and emits a laser beam when turned ON. This emitted laser beam is collimated a uniform amount via a collimator lens 2, the convergence position is adjusted by a focusing lens 3 (described in detail later), and impinges a polygonal mirror 6 through a cylindrical lens 4 and plane mirror 5. The cylindrical lens 4 focuses the laser beam linearly in the main scan direction near the deflection surface of polygonal mirror 6.

The polygonal mirror 6 is driven in rotation at constant speed in the arrow a direction. The laser beam is deflected at equiangular speed by each deflection surface based on the rotation of polygonal mirror 6, and enters the fθ lens 7. The laser beam transmitted through the fθ lens 7 is reflected by the plane mirror 8, and condensed on the surface of photosensitive member 30 so as to scan the surface of photosensitive member 30 in the arrow b direction. The fθ lens 7 mainly corrects the main scanning speed on the scanned surface (i.e., photosensitive drum 30) of the laser beam deflected at equiangular speed by said polygonal mirror 6 to uniform speed, i.e., the fθ lens 7 has the function of correcting distortion. The fθ lens 7 also corrects surface tilt error of the polygonal mirror 6 in combination with the cylindrical lens 4.

The photosensitive drum 30 is rotatably driven at constant speed in the arrow c direction, and an image (i.e., electrostatic latent image) is formed on the surface of said photosensitive drum 30 by a main scan in the arrow b direction and a sub-scan in the arrow c direction via polygonal mirror 6 and fθ lens 7.

The front edge of the laser beam in the main scan direction is reflected by plane mirror 15, transmitted through cylindrical lens 16, and enters SOS photo-sensor 17. A beam detection signal output from SOS photo-sensor 17 generates a vertical synchronizing signal to set the print start position of each single scan line.

The focusing lens 3 comprises a spherical lens 3a and cylindrical lens 3b, and is mounted on a base plate 20. The output pinion 22 of a stepping motor 21 engages a rack 20a formed on the lateral surface of said base plate 20. The lenses 3a and 3b are integratedly movable in the forward and reverse directions on the optical axis via the forward and reverse rotation of stepping motor 21 by means of signals output from the control unit 25, such that the focus position of a laser beam on the surface of photosensitive drum 30 is adjusted by said movement.

As shown in FIGS. 2(A), 2(B), 3(A), and 3(B), spherical lens 3a has optical power in the main scan direction and the sub-scan direction, whereas cylindrical lens 3b has optical power only in the sub-scan direction. In the main scan direction, the laser beam is collimated as parallel rays by collimator lens 2 and spherical lens 3a. In the sub-scan direction, the optical power and arrangement of collimator lens 2, focusing lens 3, and cylindrical lens 4 are set so as to conjugate the emission point of laser diode 1 and the vicinity of the deflecting surface of polygonal mirror 6 in the sub-scan direction.

The optical power of the spherical lens 3a is set lower than the optical power of the collimator lens 2, so as to increase the amount of movement of focusing lens 3 when adjusting the focus position. Conversely, when the optical power of spherical lens 3a is increased, spherical lens 3a must be accurately positioned in micron units to adjust focusing in millimeter units on the image plane, thereby excessively reducing the range of permissible positioning error.

Focusing lens 3 need not have a two-ply construction of lenses 3a and 3b, and may have various other constructions such as a lens of single-ply construction having a spherical surface and a cylindrical surface, or an amorphous lens having optical power in perpendicular directions.

The beam waist detection device 10 is disposed at an optically equivalent position to the scanned surface on one side of photosensitive drum 30 to detect the convergence state of a laser beam on the scanned surface. Specifically, beam waist detection device 10 comprises three spacial filters 11a, 11b, and 11c having different heights, and a photoelectric conversion element 12, wherein the center filter 11b is arranged so as to match the image surface (i.e., exposure surface on the surface of photosensitive drum 30).

Figure 5A:
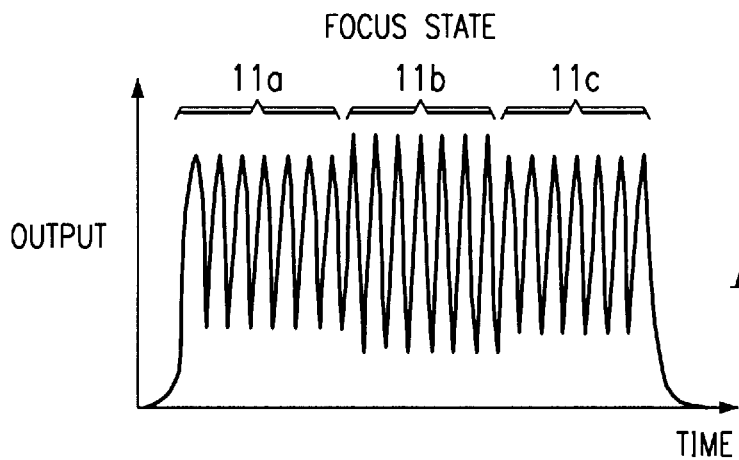
FIG. 5(A) is a graph illustrating the output signals of the beam waist detection device in a focus state.
Figure 5B:
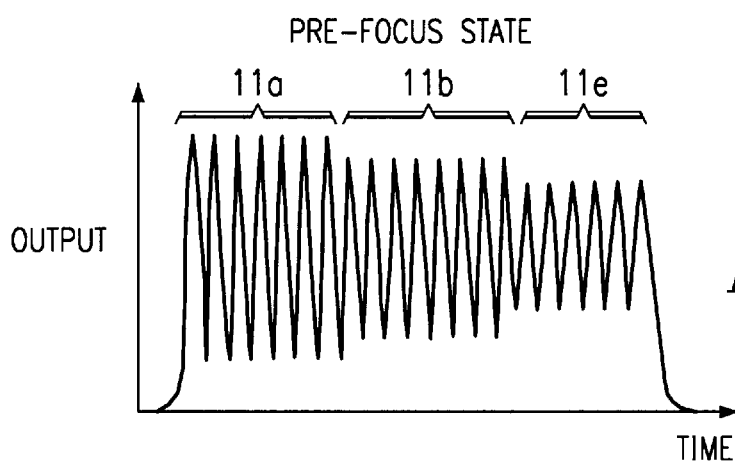
FIG. 5(B) is a graph illustrating the output signals of the beam waist detection device in a pre-focus state.
Figure 5C:
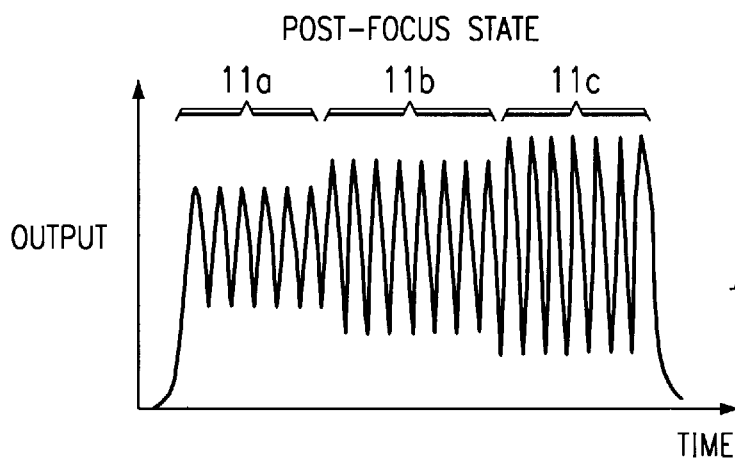
FIG. 5(C) is a graph illustrating the output signals of the beam waist detection device in a post-focus state.

The output of photoelectric conversion element 12 maximizes the contrast of filter 11b when the contrast ranges of filters 11a and 11c are identical at the focus state, as shown in FIG. 5(A). In the pre-focus state, the contrast range of filter 11a is maximized, as shown in FIG. 5(B), and in the post focus state, the contrast range of filter 11c is maximized, as shown in FIG. 5(C). Since beam waist detection device 10 detects the focus state in the main scan direction, this output signal is input to control unit 25. Control unit 25 drives stepping motor 21 to move the focusing lens 3 on the optical axis, so as to adjust the laser beam focus position on the image plane.

Figure 6:
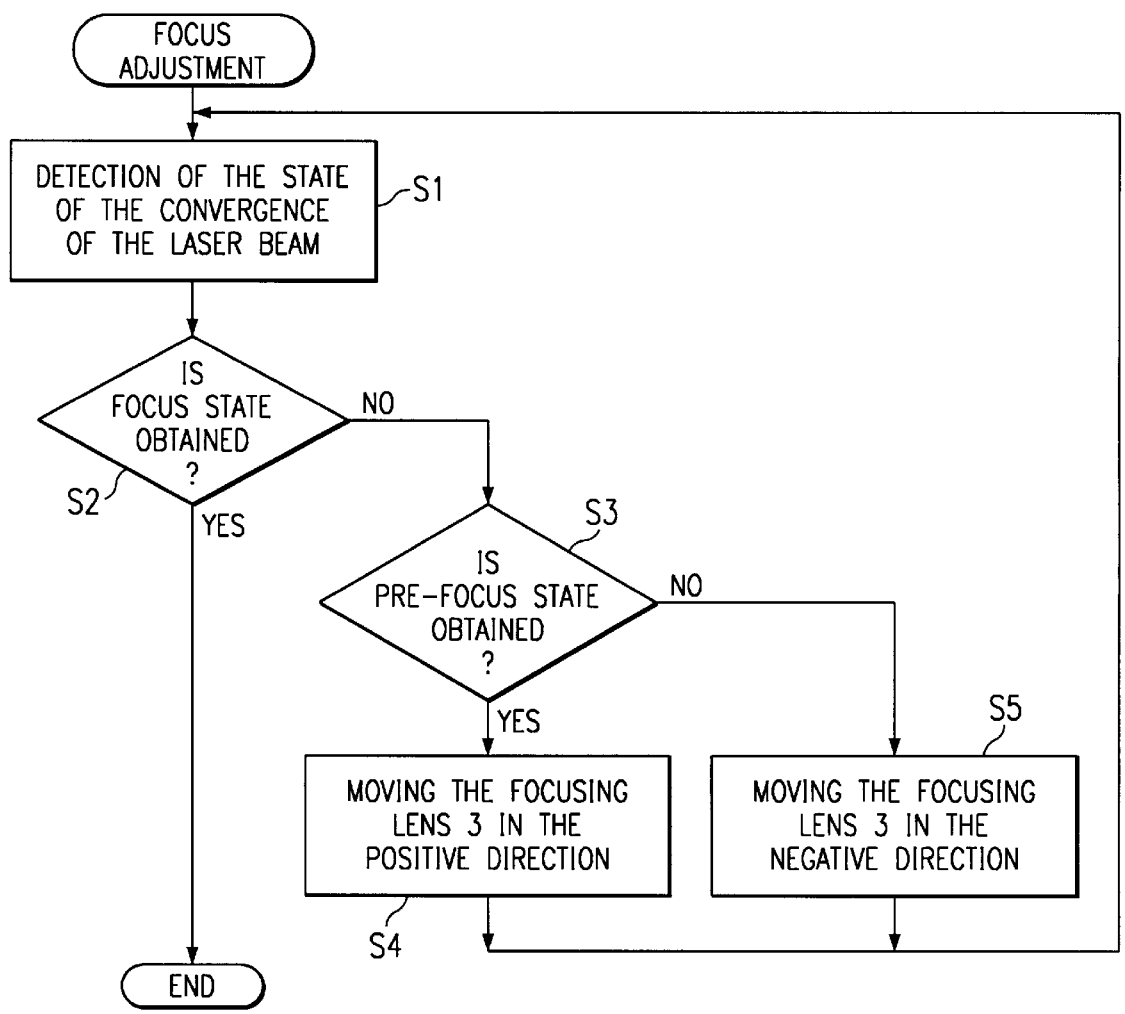
FIG. 6 is a flow chart illustrating the focus adjustment control sequence.

FIG. 6 shows an example of a control sequence of focus adjustment via control unit 25. In this example, the focus state on the image plane is detected by beam waist detection device 10 in step S1. Then, in step S2, a check is made to determine whether or not the beam focused based on the output signals of the photoelectric conversion element 12; if the beam is focused, this process ends. If the beam is not focused, however, a check is made in step S2 to determine whether or not the beam is in a pre-focus state; if the beam is in a pre-focus state, stepping motor 21 is driven in step S4 to move the focusing lens 3 a predetermined amount in the negative direction. If the pre-focus state is not determined in step S3, the determination is that the post focus state obtains, and the motor 21 is driven in step S5 to move the focusing lens 3 a predetermined amount in the positive direction. If the beam is not focused after the execution of the aforesaid process, the processes of steps S4 and S5 are repeated until a focused state is attained, and the process ends.

The amount of defocus in the main scan direction may be calculated by control unit 25 based on the output signals of the beam waist detection device 10, the amount of correction movement of focusing lens 3 may be calculated based on said amount of defocus, and stepping motor 21 may be driven in accordance with said calculated amount of correction movement so as to move said focusing lens 3.

The defocus on the image plane is based on the fluctuation of environmental temperature, and the amount of defocus can be estimated by detecting the environmental temperature. Accordingly, as an alternative to the previously mentioned beam waist detection device 10, an internal temperature sensor 40 may be installed within the apparatus as shown in FIG. 1, so as to move the focusing lens 3 in accordance with the temperature fluctuation detected by said temperature sensor 40 to adjust the focus position on the image plane.

Although focus adjustment is accomplished by detecting the convergence state in the main scan direction in the previously described embodiment, the convergence state in the sub-scan direction may be simultaneously adjusted because the focusing lens 3 has optical power in the sub-scan direction via cylindrical lens 3b. That is, adjustment of the convergence state on the image plane may be simultaneously accomplished din the main scan direction and sub-scan direction when the focusing lens 3 is moved a predetermined amount accomplish focusing in the main scan direction, by adjusting the lens spacing and optical power arrangement of the various lenses 2, 3, 4, and 7 so as to accomplish as sharp focusing as possible in the sub-scan direction. A specific example in this regard is described below with reference to FIGS. 2(A) and 2(B).

Figure 2B:
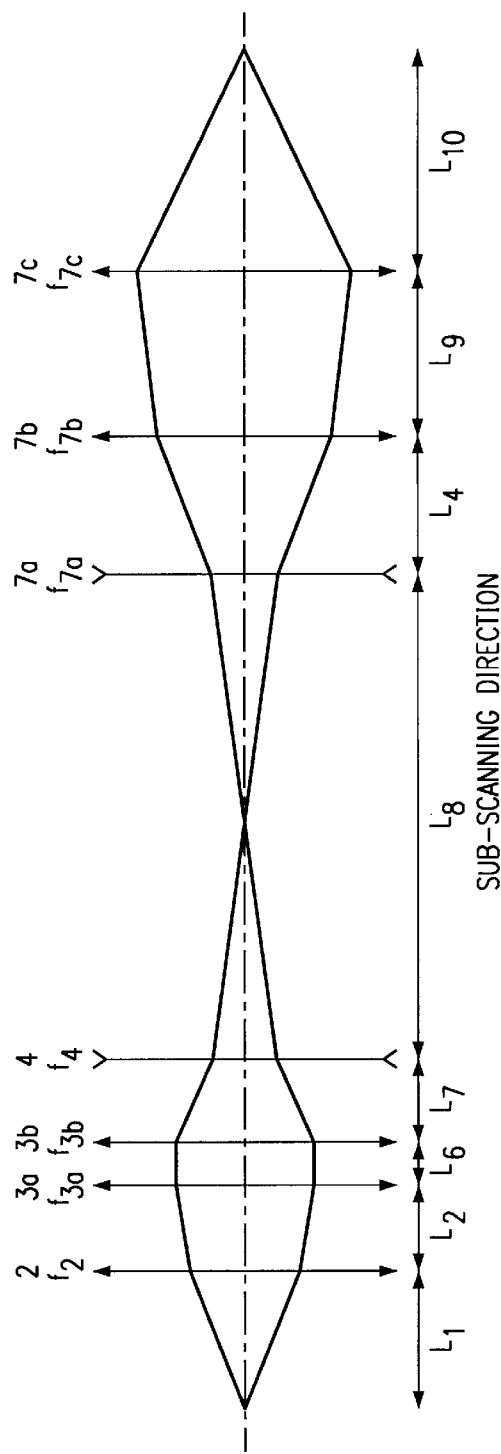
FIG. 2(B) is a diagram of the convergence state of a laser beam in the sub-scan direction.
Figure 3A:
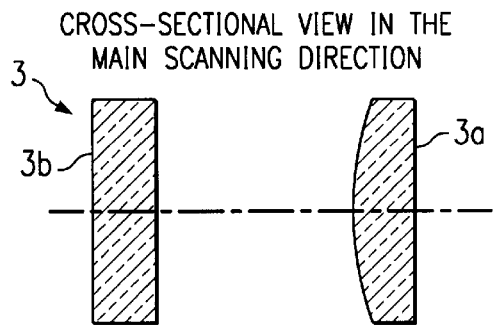
FIG. 3(A) is a cross-sectional view of the construction of a focusing lens in the main scan direction.
Figure 3B:
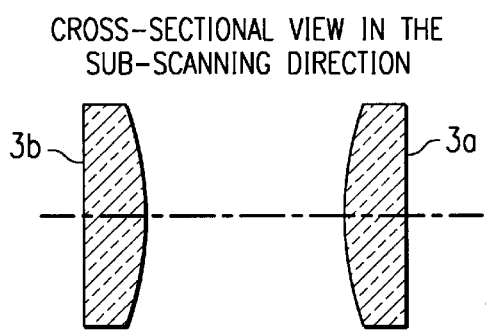
FIG. 3(B) is a cross-sectional view of a focusing lens in the sub-scan direction.
Figure 4A:
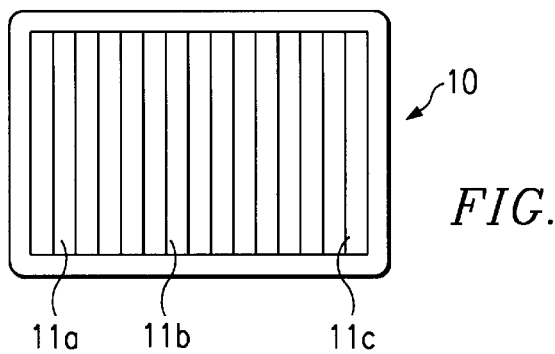
FIG. 4(A) is a plan view of a beam waist detection device.
Figure 4B:
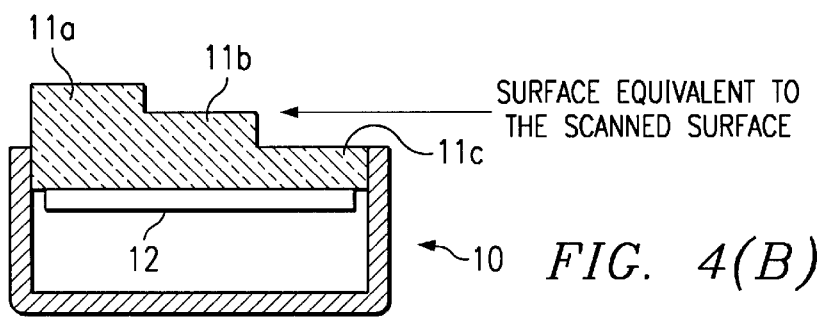
FIG. 4(B) is a cross-sectional view of a beam waist detection device.

In FIGS. 2(A) and 2(B), the focal lengths of lenses 2, 3a, 3b, 4, 7a, 7b, and 7c are designated f2, f3a, f3b, f4, f7a, f7b, and f7c, respectively, and the distances between the lenses are designated L1 through L10. The specific numerical values used in the example are set as follows. Units are in millimeters.

The distances are L1=9.7987, L2=13.2013, L3=297.0000, L4=42.4150, L5=298.3947, L6=20.1254, L7=121.0769, L8=150.5963, 9=164.0000, and L10=134.3430.

The focal lengths of the lenses are f2=10.0000, f3a=500.0000, f3b=218.0000, f4=−600.0000, f7a=−403.4260, f7b=178.7560, and f7c=92.0000.

The aforesaid construction is set so as to focus on the image plane in both the main scan direction and the sub-scan direction at room temperature (20° C.). When the environmental temperature is elevated to 25° C., a −0.50 mm defocus occurs in the main scan direction, and a +1.03 mm defocus occurs in the sub-scan direction. If the focusing lens 3 is moved −1.7 mm at this time, a +0.008 mm defocus correction is accomplished in the main scan direction, and a +0.002 mm defocus correction is accomplished in the sub-scan direction.

The laser beam scanning optical apparatus of the present invention is not limited to the previously described embodiment and may be variously modified insofar as said modifications do not depart from the scope of the invention.

In particular, the type, shape, and arrangement of optical elements of the fθ lens are optional. Although spatial lattice filters were used as a beam waist detection means, it is to be noted that various types of devices using moire fringe, or using a knife edge method may be used. Furthermore, the convergence state may be detected in the sub-scan direction to control the movement of the focusing lens. Although a polygonal mirror is used as a laser beam deflection means in the previously described embodiment, it should be understood that scanning devices using an acoustic-optic effect also may be used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam scanning optical apparatus comprising:
a focusing lens having different non-zero optical powers in a main scanning direction and in a sub-scanning direction;
moving means for moving said focusing lens in an optical direction;
detecting means for detecting a state of convergence of a laser beam on a scanned surface; and
control means for adjusting a convergence position of the laser beam by driving said moving means based on the detection result of said detecting means so as to move said focusing lens,
wherein said non-zero optical powers of the focusing lens are fixed powers which are independent of a position of the focusing lens.

2. A laser beam scanning optical apparatus as claimed in claim 1, wherein said focusing lens comprises a single lens element having optical powers both in the main scanning direction and in the sub-scanning direction and a cylindrical lens having optical power only in the sub-scanning direction.

3. A laser beam scanning optical apparatus as claimed in claim 1, wherein said moving means comprises:
a motor having a output pinion; and
a base plate mounting said focusing lens thereon and having a rack formed on a lateral surface thereof, said rack engaging said output pinion.

4. A laser beam scanning optical apparatus comprising:
a laser source emitting a laser beam;
a collimator lens for collimating the laser beam;
a focusing lens having different non-zero optical powers in a main scanning direction and in a sub-scanning direction;
a scanner for deflecting the laser beam;
a scanning lens;
moving means for moving said focusing lens in an optical direction;
detecting means for detecting a state of convergence of the laser beam on a scanned surface; and
control means for adjusting a convergence position of the laser beam by driving said moving means based on the detection result of said detecting means so as to move said focusing lens.

5. In a laser beam scanning optical apparatus, a method of correcting a state of convergence of a laser beam on a scanned surface comprising the steps of:
detecting a state of convergence of the laser beam on the scanned surface by a detector;
controlling the convergence position of the laser beam by moving a focusing lens having different non-zero optical powers in a main scanning direction and in a sub-scanning direction based on a result detected by the detector,
wherein said non-zero optical powers of the focusing lens are fixed powers which are independent of a position of the focusing lens.

6. A laser beam scanning optical apparatus comprising:
a focusing lens having different non-zero optical powers in a main scanning direction and a sub-scanning direction;
moving means for moving said focusing lens in an optical direction;
detecting means for detecting a condition affecting a focus of a laser beam on a surface; and
control means for adjusting a convergence position of said laser beam by operating said moving means to move said focusing lens based upon a result of said detecting means,
wherein said non-zero optical powers of the focusing lens are fixed powers which are independent of a position of the focusing lens.

7. A method of adjusting a convergence position of a laser beam, comprising the steps of:
detecting a condition affecting a focus of said laser beam on a surface;
controlling the convergence position of said laser beam by moving a focusing lens, having different non-zero optical powers in a main scanning direction and a sub-scanning direction, based on a result of said detecting step,
wherein said non-zero optical powers of the focusing lens are fixed powers which are independent of a position of the focusing lens.

8. A laser beam scanning optical apparatus comprising:

a focusing lens having different non-zero optical powers in a main scanning direction and in a sub-scanning direction, said focusing lens comprising a lens element having non-zero optical power in the main scanning direction and in the sub-scanning direction;

moving means for moving said focusing lens in an optical direction;

detecting means for detecting a state of convergence of a laser beam on a scanned surface; and control means for adjusting a convergence position of the laser beam by driving said moving means based on the detection result of said detecting means so as to move said focusing lens.

9. In a laser beam scanning optical apparatus, a method of correcting a state of convergence of a laser beam on a scanned surface comprising the steps of:

detecting a state of convergence of the laser beam on the scanned surface by a detector;

controlling the convergence position of the laser beam by moving a focusing lens, having different non-zero optical powers in a main scanning direction and in a sub-scanning direction, based on a result detected by the detector, said focusing lens comprising a lens element having non-zero optical power in the main scanning direction and in the sub-scanning direction.

10. A laser beam scanning optical apparatus comprising:

a focusing lens having different non-zero optical powers in a main scanning direction and a sub-scanning direction, said focusing lens comprising a lens element having non-zero optical power in the main scanning direction and in the sub-scanning direction;

moving means for moving said focusing lens in an optical direction;

detecting means for detecting a condition affecting a focus of a laser beam on a surface; and control means for adjusting a convergence position of said laser beam by operating said moving means to move said focusing lens based upon a result of said detecting means.

11. A method of adjusting a convergence position of a laser beam, comprising the steps of:

detecting a condition affecting a focus of said laser beam on a surface;

controlling the convergence position of said laser beam by moving a focusing lens, having different non-zero optical powers in a main scanning direction and a sub-scanning direction, based on a result of said detecting step, said focusing lens comprising a lens element having non-zero optical power in the main scanning direction and in the sub-scanning direction.

* * * * *